United States Patent [19]

Swank

[11] 4,144,025

[45] Mar. 13, 1979

[54] PROCESS FOR MAKING DISPERSIONS COMPRISING SPHERICAL PARTICLES

[75] Inventor: Thomas F. Swank, Sudbury, Mass.

[73] Assignee: Polaroid Corporation, Cambridge, Mass.

[21] Appl. No.: 793,063

[22] Filed: May 2, 1977

[51] Int. Cl.$^2$ .................. C09B 67/00; B01J 13/00
[52] U.S. Cl. .................................... 8/79; 8/41 R; 8/82; 8/92; 252/311; 252/314
[58] Field of Search ............... 252/311, 314; 8/79, 8/82, 92

[56] References Cited

U.S. PATENT DOCUMENTS 3,830,750  8/1974  Wellman ........................ 252/316

FOREIGN PATENT DOCUMENTS 483221  4/1938  United Kingdom ................ 252/314

*Primary Examiner*—Richard D. Lovering
*Attorney, Agent, or Firm*—Louis G. Xiarhos; Sheldon W. Rothstein

[57] ABSTRACT

Dispersions of spherical particles of organic materials are obtained by continuously precipitating the organic material from solution in a volatile water miscible solvent which contains at least ten percent by weight water, by adding water containing a dispersing agent. Solvent is rapidly removed before recrystallization can take place thereby allowing the precipitated particles to be recovered in a spherical habit rather than in the normal crystal habit for the material.

6 Claims, 1 Drawing Figure

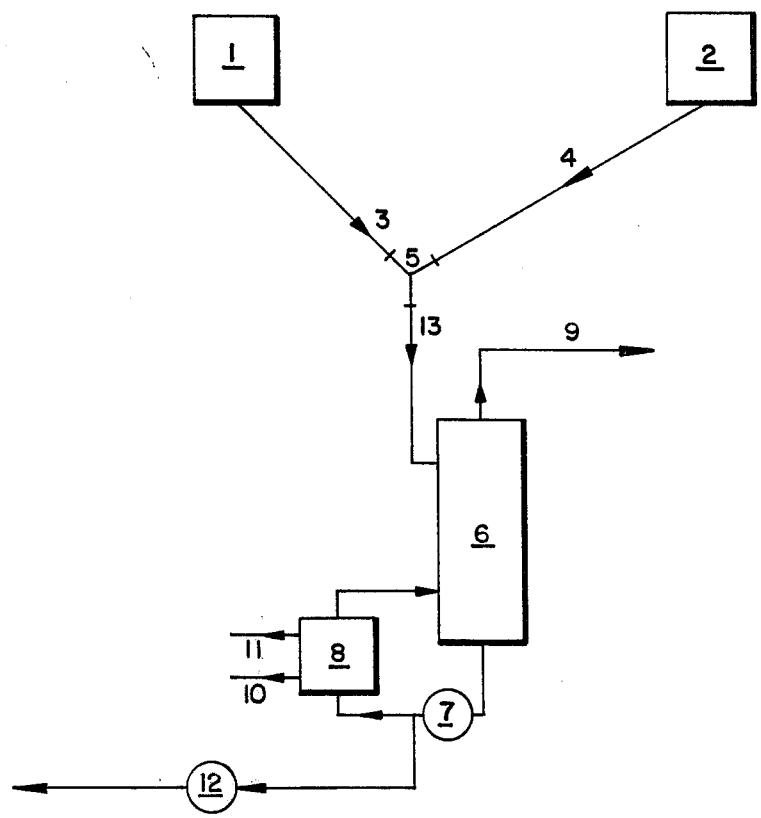

PROCESS FOR MAKING DISPERSIONS COMPRISING SPHERICAL PARTICLES

BACKGROUND OF THE INVENTION

Dispersions of water insoluble organic materials, such as dye particles, find uses in many areas of technology, one of the more notable of which is color photography. These dispersions are commonly made by milling the dye material with a carrier fluid and a dispersant.

Dye particles are generally employed in a crystalline habit, which include needles and platelets. It has been shown by the present invention that if the dye particles can be made spherical, handling advantages are obtained. For example, lower viscosities result from dispersions of spherical particles and such dispersions have greater stability than dispersions of needles, platelets and other non-compact habits. Non-dye materials, such as, for example, methyl phenyl hydroquinone may also be recovered in a spherical habit by the present invention.

It is apparently a property of crystalline materials to initially precipitate as spheres. In their study of inorganic sols, Berestneva et al. [Kolloid. Zh. 12, 338 (1950); 13 323 (1951); 14, 395 (1952); USP. KHIM. 24, 249 (1955)] found that only upon standing in a solvent medium would initially precipitated spherical particles recrystallize to their predominately stable crystal habit. It is theorized that when a particle is initially precipitated from solution it does not have time to form as well ordered crystal, but instead is composed of a random array of crystallites. Because of surface forces these crystallites tend to associate in a spherical habit.

It has been discovered and claimed in the copending U.S. patent application of Edgar Gutoff, Ser. No. 793,062, filed on the same day hereof and assigned to Polaroid Corporation, that stable dispersions of spherical particles of organic materials such as dyes can be formed by rapidly precipitating the material from an organic solution and quickly removing solvent thereby resulting in a stable dispersion of spherical material particles. All this is preferably done in the presence of a suitable dispersing agent to prevent agglomeration of the particles. This is also preferably accomplished in a continuous system under constant conditions whereby residence times can be adjusted to provide accurate control of the size of the resultant spherical particles. The process of the Gutoff invention is applicable to any organic material which is substantially water insoluble and soluble in an organic solvent miscible with and more volatile than water.

The present invention is an improvement over the above described Gutoff process and requires that the organic solvent stream of the Gutoff process contain at least ten percent by weight water but less than the amount of water which would cause the dissolved organic material to precipitate from solution. By this method large particles are minimized and controlled dispersions with particles less than 1 micron in size are prepared.

DESCRIPTION OF THE DRAWING

The FIGURE illustrates a typical scheme by which the continuous process of the present invention may be performed.

DETAILED DESCRIPTION OF THE INVENTION

The organic material which is to be recovered as a dispersion of crystals with spherical habits is first dissolved in a low boiling organic solvent which is miscible with water. At least about ten percent water is added to the organic stream. According to the present invention, the amount of water added is limited only by the fact that it must be insufficient to precipitate dissolved material from solution. Preferably a dispersant is also added to the organic stream. Dissolved material is then precipitated in a mixer by adding additional water containing a dispersing agent. For convenience, the mixing is preferably done in a "T" type mixer with the solution entering in one arm and the additional water and dispersing agent entering in another. The additional water raised the quantity of water above the amount needed to cause precipitation of the dissolved material.

In accordance with the above discussion, the original habit assumed by the precipitated material is spherical and the dispersing agent keeps the particles well dispersed and separated. The solvent present in the dispersion is quickly removed, preferably by introducing the dispersion onto the top plate of a sieve tray distillation column with no downcomers, though other apparatus such as, for example, other types of columns and mixed film evaporators may be used. Most of the solvent is flashed off and the rest is removed in the stripping section. The dispersion is preferably concentrated in the column reboiler though this can be done in a separate unit. Clean solvent-water solutions can be condensed and recovered. To keep the temperatures down the column will be preferably operated under vacuum.

A pilot scale distillation unit capable of processing approximately 300 grams of dye per hour was constructed as shown in FIG. 1. During actual experiments, reservoir 1 contains a quantity of dye dissolved in an organic solvent miscible with water, and a quantity of water and dispersant. Reservoir 2 contains water and a dispersant. The reservoir 1 and 2 liquids flow respectively through conduits 3 and 4 and mix in mixer 5, which is a standard "T", where dye precipitation commences. From there the mixture proceeds through conduit 13 to column 6, which consists of a sieve tray column with no downcomers in a 15.2 mm diameter glass column and a 101 mm thick wire mesh entrainment separator at the top. A reboiler 8, consisting of a helical double pipe heat exchanger, pump 7, heating water pipes 10 and 11, product pipe 12 and associated conventional equipment complete the apparatus. Conduit 9 leads to conventional solvent recovery equipment. Pneumatic flow and level controllers control the feed flows, the bottoms level and the condensate level in a condensate accumulator. The bottoms level controller adjusts the flow of hot water in conduit 10 to reboiler 8. After start up, once the concentration of dye in the bottoms reaches the aim value, the product dispersion is removed at a constant continuous rate by peristaltic pump 12.

EXAMPLE I

Good quality dispersions consisting essentially of spherical particles made in the above apparatus were produced using a cyan dye

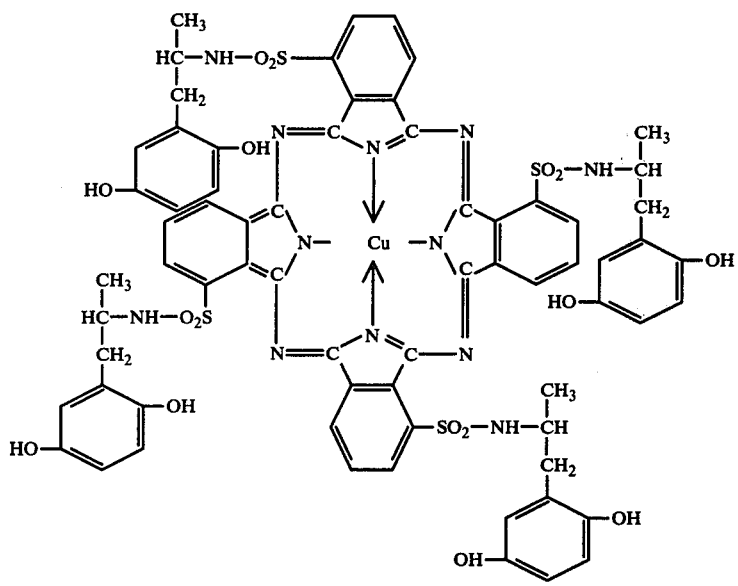

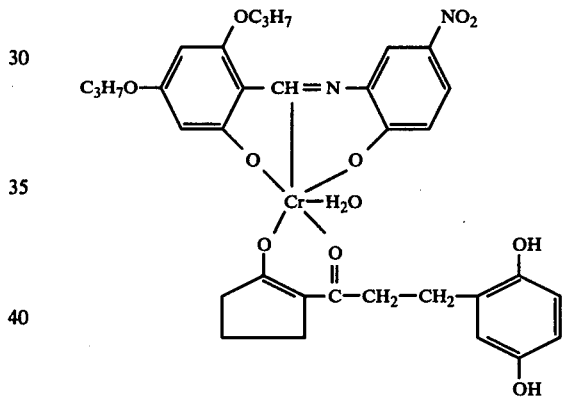

under the comparative conditions shown in the following Table with a residence time of one second between the mixing "T" and the column. In Run 2, the dye solution contained 0.6 percent water and in Run 1 it contained 38 percent water. Coulter size analysis demonstrated that Run 2 contained ten times as many particles greater than one micron as compared with Run 1, and over 21 times more particles of over 3 microns than Run 1.

|  | Run 1 | Run 2 |
| --- | --- | --- |
| Organic Solvent | Acetone | Acetone |
| Organic Feed - % dye | 3.5 | 3.5 |
| Organic Feed - % $H_2O$ | 38 | 0.6 |
| Aqueous Feed - % Tamol 731 | 6% on dye | 6% on dye |
| Aqueous/Organic - Feed wt. ratio | 2.75 | 2.75 |
| Total flow in | 250 gms/min | 250 gms/min |
| Dye Feed Rate | 4 gms/min | 4 gms/min |
| Column pressure | 50 torr | 50 torr |
| Coulter Size Analysis | 0.007%>3$\mu$ | 0.15%>3$\mu$ |
|  | 0.3%>1$\mu$ | 3.0%>1$\mu$ |

With the continuous process described, the dye yield was found to be one hundred percent, excluding line losses during shut down of the unit.

EXAMPLE II

It was found in experiments with the yellow dye dissolved in a mixture of acetone and methanol that as with the above cyan dye, particle size distribution was a function of the aqueous content of the dye solution stream.

The above yellow dye was dissolved in a solvent which was 50 percent by weight acetone and 50 percent by weight methanol. The continuous precipitation apparatus employed in Example I was also employed here. In Run 1, the dye solution stream contained 3 percent water and in Run 2 it contained 14.5 percent water. The following tabulation shows the markedly higher percentage of small particles in Run 1 as compared with Run 2.

|  | Run 1 | Run 2 |
| --- | --- | --- |
| Organic Solvent | 50/50 Acetone/$CH_3OH$ | 50/50 Acetone/$CH_3OH$ |
| Organic Feed - % dye | 3.4 | 4.7 |
| Organic Feed - % Tamol 731 | 3% on dye | 3% on dye |
| Organic Feed - % water | 14.5 | 3.2 |
| Aqueous Feed - % Tamol 731 | 3% on dye | 3% on dye |
| Aqueous/Organic Feed wt. ratio | 1.9 | 1.6 |
| Total Flow In | 225 gms/min | 210 gms/min |
| Dye Feed Rate | 3.1 gms/min | 3.0 gms/min |
| Column Pressure | 50 torr | 50 torr |
| Millipore Size Analysis | 97%<0.8$\mu$ | 92%<0.8$\mu$ |
|  | 84%<0.45$\mu$ | 63%<.45$\mu$ |

-continued

| | Run 1 | Run 2 |
|---|---|---|
| | 47%<.22μ | 22%<.22μ |

It was found that better dispersions were produced when the organic, as well as the aqueous stream contained some dispersant.

The Millipore size analysis was performed by spectrophotometrically analyzing produce samples and reanalyzing such samples after passing them through 0.8μ, 0.45μ and 0.22μ Millipore filters, respectively, and comparing the spectrophotometric analysis for percent of dye before and after filtration. In the sample containing 14.5 percent water, 97 percent of the particles of the dispersion were less than 0.8μ in diameter while with 3.2 percent water, only 92 percent of the particles were less than 0.8μ in diameter. At the other end, the former instance 47 percent of the particles were under 0.22μ in diameter while in the later instance only 22% of the particles were less than 0.22μ in diameter.

In the process of the present invention any suitable volatile organic solvent for the dye which is miscible with water may be used, as for example, acetone; acetone-methanol mixtures; methanol-isopropanol mixutres; tetrahydrofuran; etc. Likewise, numerous conventional dispersants may be used, such as, for example, polyvinylpyrrolidone; American Cyanamid's Aerosol OT; Nopco Chemical's Lomar D; Rohm and Haas' Triton 405, Triton CF-10 and Triton X-100; etc.

Unless otherwise noted all ratios of components are on a weight basis.

Since certain changes may be made in the above method without departing from the scope of the invention herein involved, it is intended that all matter contained in the above description or shown in the accompanying drawings shall be interpreted as illustrative and not in a limiting sense.

What is claimed is:

1. In a process for preparing an aqueous dispersion of spherical particles of an organic material which is substantially insoluble in water and is soluble in an organic solvent which is more volatile than and miscible with water, which comprises:
    making a solution of said material in an organic solvent which is more volatile than and miscible with water;
    mixing said solution of material with an aqueous solution of a dispersant for precipitated particles whereby particles having a substantially spherical crystal habit are rapidly formed; and
    quickly removing said organic solvent by vaporization whereby a dispersion of spherical particles of said organic material is obtained;
    the improvement wherein said solution with said organic solvent additionally includes at least ten percent by weight water, but less water than would cause precipitation of said organic material from solution prior to said mixing.

2. The process of claim 1 wherein said organic material is a dye.

3. The process of claim 1 wherein the time between mixing the dye solution with the aqueous solution and removing the organic solvent is less than 60 seconds.

4. The process of claim 3 wherein said time is less than 30 seconds.

5. In a process for continuously producing an aqueous dispersion of spherical particles of an organic material which is substantially insoluble in water and is soluble in an organic solvent which is more volatile than and miscible with water, which comprises:
    making a solution of said material in an organic solvent which is more volatile than and miscible with water;
    continuously mixing a stream of said solution with a continuous stream of an aqueous solution of a dispersant for precipitated particles whereby particles having a substantially spherical crystal habit are rapidly formed;
    continuously and quickly removing said organic solvent by vaporization; and
    continuously recovering a dispersion of spherical particles of said organic material;
    the improvement wherein said solution with said organic solvent additionally includes at least ten percent by weight water, but less water than would cause precipitation of said organic material from solution.

6. The process of claim 5 wherein said organic material is a dye.

* * * * *